United States Patent [19]
Pinhas

[11] 3,843,725
[45] Oct. 22, 1974

[54] 4[2-(α-METHYL-PHENETHYLAMINO)-ETHOXY]-BENZENES

[75] Inventor: Henri Pinhas, Paris, France

[73] Assignee: Laboratoires Laroche Navarron, Levallois, France

[22] Filed: Dec. 21, 1971

[21] Appl. No.: 210,560

[30] Foreign Application Priority Data
Dec. 28, 1970   France .............................. 70.46877

[52] U.S. Cl..... 260/570.7, 260/501.18, 260/501.19, 260/570 R, 260/570.6, 260/591, 269/612 D, 424/316, 424/330

[51] Int. Cl. .......................................... C07c 93/06

[58] Field of Search........ 260/570.7, 501.18, 501.19

[56] References Cited
UNITED STATES PATENTS
| | | | |
|---|---|---|---|
| 2,683,719 | 7/1954 | Kerwin et al. ............... | 260/570.7 X |
| 3,056,836 | 10/1962 | Moed........................... | 260/570.7 X |
| 3,542,792 | 11/1970 | Satzinger ..................... | 260/570.7 X |

Primary Examiner—Robert V. Hines
Attorney, Agent, or Firm—Oldham & Oldham Co.

[57] ABSTRACT

This invention relates to phenoxyalkylamines having the formula:

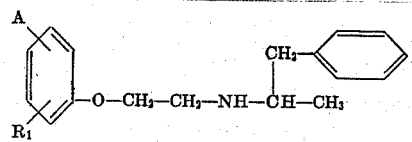

in which $R_1$ is hydrogen, halogen, an alkyl or an alkoxy group, A is an alkyl, alkylaryl, cycloalkyl, alkenyl, cycloalkenyl group or a group

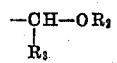

in which $R_2$ is an alkyl or alcoxy alkyl group, and $R_3$ is an alkyl, cycloalkyl or aryl group, and their acid addition salts.

Said phenoxyalkylamines possess coronary vasodilatator and cardiotonic properties.

3 Claims, No Drawings

4[2-(α-METHYL-PHENETHYLAMINO)-ETHOXY]-BENZENES

The present invention relates to phenoxyalkylamines, to processes for their preparation and to the applications thereof, particularly in human medicine.

There is already known a therapeutic composition useful in particular as coronary vasodilatator and as antispasmodic drug, comprising, as active ingredient, a phenoxyalkylamine having the formula:

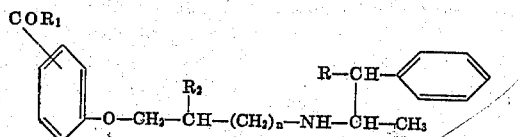

in which $n$ is zero or 1, R is hydrogen or a hydroxy group, $R_1$ is an alkyl group and $R_2$ is hydrogen, a hydroxy group or an alkyl group, $R_2$ being other than hydroxy when $n$ is equal to zero, or a product resulting from hydrogenation of the ketone group $COR_1$ thereof to an alcohol group $CHOHR_1$.

The vasodilatator and spasmolytic properties of said prior phenoxyalkylamines were found to be quite outstanding.

However, there have now been found new phenoxyalkylamines which, while having still better vasodilatator and spasmolytic properties than those — although already exceptional — of the prior phenoxyalkylamines, have a better therapeutic ratio than the latter. Phenoxyalkylamines were prepared which exhibit toxicity only at dosages above 500 mg and sometimes up to 1,500 mg under the same experimental conditions as those mentioned above.

Said new phenoxyalkylamines according to the invention have the formula:

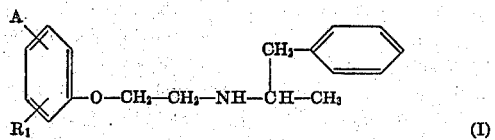

in which $R_1$ is hydrogen, halogen, an alkyl or alkoxy group, A is an alkyl, alkylaryl, cycloalkyl, alkenyl, cycloalkenyl group or a group

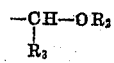

in which $R_2$ is an alkyl or alkoxyalkyl group, and $R_3$ is an alkyl, cycloalkyl or aryl group.

In the above definition, the alkyl and alkenyl radicals are advantageously lower radicals, having typically from one to 12 carbon atoms and preferably from one to six carbon atoms.

When $R_3$ is an aryl group, it is advantageously a phenyl group, while the cyclohexyl ring is the preferred cycloalkyl ring for A. In the case where A is cycloalkenyl, it is frequently found that the double bond in the ring may migrate to a juxtanuclear position.

The phenoxyalkylamines of this invention may also exist in the form of acid addition salts thereof with inorganic or organic acids and typically as the hydrohalides, particularly the hydrochlorides and hydrobromides, as the nitrates, sulfates, methanesulfonates, lactates, citrates, maleates, tartrates, acetylsalicylates, acetates, oxalates, and the like salts which are readily prepared by reacting compounds (I) as the free base with stoichiometrically equivalent amounts of the selected acid or acids.

Formula (I) always includes at least one asymmetrical carbon atom. It is understood that the invention includes within its scope the optically active and racemic forms of the phenoxyalkylamines having the formula (I).

To prepare said phenoxyalkylamines, α-methyl-phenethylamine having the formula:

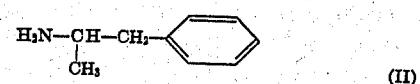

may be condensed with a phenoxy intermediate having the formula:

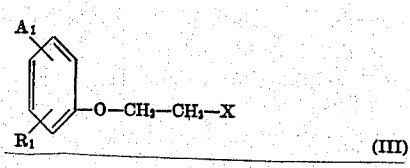

in which A represents a group A or an "A-genic" group, X is halogen, for example bromine, $R_1$ and A having the above-defined meanings and, when A is an A-genic group, it is converted to a group A.

The term "A-genic group" denotes any group capable of giving rise to a group A.

The phenoxyalkylamines of the prior art are exemplary of condensations products carrying an A-genic group.

Their alcohol groups $CHOHR_1$, thus, of $CHOHR_3$ type, may be etherified, for example by heating in alcohol medium ($R_2OH$) in the presence of hydrochloric acid, to give phenoxyalkylamines according to the invention, in which A is

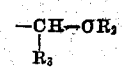

These same alcohol groups, dehydrated in conventional manner with acids (e.g., hydrochloric, sulfuric) or bases (sodium hydroxide), lead to alkenyl compounds according to the invention.

Also, the prior art phenoxyalkylamines having $COR_1$ groups may be converted to phenoxyalkylamines according to the invention, in which A is alkyl, by reduction by means of a zinc/hydrochloric acid system, according to Clemmensen's method.

It is understood that it is always possible to prepare first an intermediate compound (III) substituted in the desired manner, and then simply to condense same with α-methyl-phenethylamine, to give the phenoxyalkylamines according to the invention, without any subsequent synthesis step.

This condensation may be carried out under refluxing conditions, within an alcohol solvent, such as ethanol, in the presence of triethylamine or other basic agents which bind the hydrohalic acid formed.

Intermediate compounds (III) are obtained by reacting a phenol compound of the formula:

with a di-halogenated compound:

$$Y - CH_2 - CH_2 - X$$

Y being halogen and the other symbols having the aforementioned meanings.

This reaction is preferably conducted under refluxing conditions, within water, in the presence of a stoichiometric amount of metal hydroxide as binding agent for the hydrohalic acid released, for example sodium hydroxide.

The following examples illustrate the invention without, however, limiting same.

EXAMPLE 1

1-Propyl-4-[2-(α-methyl-phenethylamino)-ethoxy]-benzene
A = —$C_3H_7$; $R_1$ = H Procedure 1

4-(2-bromo-ethoxy)-1-propyl-benzene (III):A = —$C_3H_7$; $R_1$ = H; X = Br) is first prepared. p.Hydroxy-propylbenzene (0.25 mole) is dissolved in water (350 ml) containing sodium hydroxide (0.25 mole). 1,2-Dibromo-ethane (0.3 mole) is added thereto. After refluxing and stirring during 20 hours, the reaction mixture is allowed to cool. It is extracted with diethyl ether, washed with dilute sodium hydroxide and then with water. The ether phase is dried, concentrated, and the residue is then distilled: b.p.$_1$ = 115°–117°C (boiling point under a pressure of 1 mm Hg). The bromo derivative obtained above (0.2 mole), α-methyl-phenethylamine (0.2 mole) and triethylamine (0.6 mole) dissolved in ethanol (400 ml) and then refluxed during 48 hours. The alcohol solvent is removed in vacuo. The residue is dissolved in an organic solvent, such as diethyl ether or ethyl acetate. Hydrochloric acid (ca. 10 percent solution) is then added to the well stirred solution. The resulting crystals are suction filtered. 1-Propyl-4-[2-(α-methyl-phenethylamino)-ethoxy]-benzene hydrochloride is then recrystallized from ethanol (Yield = 73 %). M.p. 171°–173°C.

Procedure 2

Zinc amalgam (10 g), 60 % hydrochloric acid (60 ml) and 4-[2-(α-methyl-phenethylamino)-ethoxy]-propiophenone hydrochloride (3 g) (described in French B.S.M. M-7255) are vigorously stirred and heated to refluxing. Concentrated hydrochloric acid (5 ml) is added at 2 hour intervals, during 12 hours. Generally, in the hot, the reaction medium becomes a homogeneous solution. In the cold, 1-propyl-4-[2-(α-methyl-phenethylamino)-ethoxy]-benzene hydrochloride precipitates out in the form of crystals which are recrystallized from ethanol.

EXAMPLE 2

1-Heptyl-4-[2-(α-methyl-phenethylamino)-ethoxy]-benzene.
A = $CH_3$—$(CH_2)_6$—; $R_1$ = H Procedure 1

4-(2-bromo-ethoxy)-1-heptyl-benzene is prepared under the conditions described in Example 1 from par-a-hydroxy-1-heptyl-benzene, b.p.$_1$ = 120°–125°C.

This bromo derivative is condensed with α-methyl-phenethylamine under the same conditions as in Example 1.

1-Heptyl-3-[2-(α-methyl-phenethylamino)-ethoxy]-benzene hydrochloride is then obtained. M.p. = 177°–179°C.

Procedure 2

4-[2-(α-methyl-phenethylamino)-ethoxy]-heptanophenone hydrochloride (3 g) ($R_3$ = —$(CH_2)_5CH_3$; $R_1$ = H), prepared as described in French B.S.M. M-7255 (M.p. = 186°–189°C), is reduced by reaction according to Clemmensen under the conditions described in Example 1. This gives 1-heptyl-4-[2-(α-methyl-phenethylamino)-ethoxy]-benzene hydrochloride. M.p. = 177°–179°C.

EXAMPLE 3

1-Propyl-3-methyl-4-[2-(α-methyl-phenethylamino)-ethoxy]-benzene.
A = —$(CH_2)_2CH_3$; $R_1$ = —$CH_3$ The hydrochloride of this product, prepared according to either of the procedure described in Example 1, melts at 165°–168°C.

EXAMPLE 4

1-[1-ethoxy-propyl]-4-[2-(α-methyl-phenethylamino)-ethoxy]-benzene.

$$A = -CH-O-C_2H_5;$$
$$\quad\quad\quad\; |$$
$$\quad\quad\quad C_2H_5$$

$R_2 = R_3 = C_2H_5$; $R_1 = H$ 1-(1-hydroxy-propyl)-4-[2-(methyl-α-phenethylamino-ethoxy]-benzene hydrochloride (described in French B.S.M. M-7255) (15 g) is refluxed in an ethanol solution (50 ml) containing 10 percent of gaseous hydrogen chloride. After refluxing during 8 hours, the reaction mixture is concentrated to dryness. It is then recrystallized from ethanol/diethyl ether 1:1, to give 1-(1-ethoxy-propyl)-4-[2-(α-methyl-phenethylamino)-ethoxy]-benzene hydrochloride, in quantitative yield. M.p. = 158°–159°C.

EXAMPLE 5

Substituting methanol for ethanol, 1-[1-methoxy-propyl]-4-[2-(α-methyl-phenethylamino)-ethoxy]-benzene hydrochloride is obtained, under the same conditions, instead of the derivative of Example 4.

$$A=CH-OCH_3;$$
$$\quad\quad |$$
$$\quad\quad C_2H_5$$

$R = C_2H_5$; $R_2 = CH_3$; $R_1 = H$
M.p. = 165°–167°C.

EXAMPLE 6

Substituting 1-hydroxy-2-methoxy-ethane for ethanol, 1-[-1-(β-methoxy-ethoxy)-propyl]-4-[2-(α-methyl-phenethylamino)-ethoxy]-benzene hydrochloride is obtained, under the same conditions, instead of the derivative of Example 4.
M.p. = 190°–192°C.

$$A=-CH-O-CH_2-CH_2OCH_3;$$
$$\quad\quad\;\; |$$
$$\quad\quad\; C_2H_5$$

$R_3 = C_2H_5$; $R_2 = CH_2$—$CH_2OCH_3$; $R_1 = H$

EXAMPLE 7

1-[1-cyclohexyl-1-ethoxy-1)-methyl]-4-[2-(α- methyl-phenethylamino)-ethoxy]-benzene hydrochloride:

"—A=—CH—OC₂H₅":

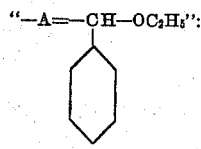

R₃ = cyclohexyl; R₂ = C₂H₅; R₁ = H
is obtained in ethanol solution containing hydrochloric acid under the conditions described in Example 4 from 1-[(1-cyclohexyl-1-hydroxy)-methyl]-4-[2-(α-methyl-phenethylamino)-ethoxy]-benzene described in French Pat. No. PV 70 46 875 filed by Applicant. It melts at 160°–162°C.

EXAMPLE 8

Substituting 1-hydroxy-2-methoxy-ethane for ethanol, 1-[(1-cyclohexyl-1-β-methoxyethoxy)-methyl]-4-[2-(α-methyl-phenethylamino)-ethoxy]-benzene hydrochloride is obtained under the same conditions described in Example 7.
M.p. = 150°–152°C.
(R₃ = cyclohexyl; R₂ = —CH₂—CH₂—OCH₃; R₁ = H)

EXAMPLE 9

1'-[α-ethoxy-benzyl]-4'-[2-(α-methyl-phenethylamino)-ethoxy]-benzene:

A=—CH—O—C₂H₅;

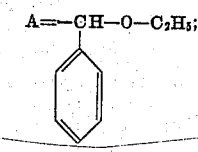

R₃ = phenyl; R₂ = C₂H₅; R₁ = H
is obtained in ethanol solution containing hydrochloric acid, under the conditions described in Example 4, from 1-[α-hydroxy-benzyl]-4-[2-(α-methyl-phenethylamino)-ethoxy]-benzene described in French Pat. No. PV 70 46 875 by Applicant. It melts at 156°–158°C.

EXAMPLE 10

1-[α-(β-methoxyethoxy)-benzyl]-4-[2-(α-methyl-phenethylamino)-ethoxy]-benzene hydrochloride melts at 124°–126°C and is obtained by a process similar to that described in Example 9.

A=—CH—OCH₂—CH₂OCH₃;

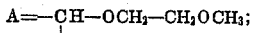

R₃ = phenyl; R₂ = (CH₂)₂OCH₃; R₁ = H

EXAMPLE 11

1-Propenyl-4-[2-(α-methyl-phenethylamino)-ethoxy]-benzene and its hydrochloride.
A = —CH = CH—CH₃; R₁ = H
Procedure 1
4-(2-bromo-ethoxy)-1-propenyl-benzene is first prepared. (III):A = —CH = CH—CH₃; R₁ = H; X = Br
p-Hydroxy-propenyl-benzene (0.1 mole) is dissolved in water (100 ml) containing sodium hydroxide (0.1 mole). 1,2-Dibromo-ethane (0.13 mole) is then added thereto.

The product, b.p.₁ = 120°–122°C is obtained after refluxing during 24 hours and the usual treatment.

The bromo derivative (0.05 mole), α-methyl-phenethylamine (0.05 mole) and triethylamine (0.15 mole) in ethanol are then refluxed during 48 hours. Treatment as in Example 1 gives the hydrochloride, which melts at about 145°–148°C.

Procedure 2
1-[(1-hydroxy-propyl)]-4-[2-(α-methyl-phenethylamino)-ethoxy]-benzene (ca. 0.01 mole) (described in French B.S.M. M–7255) is refluxed during about 10 hours, in the presence of potassium hydrogen sulfate (0.1 mole) in water (ca. 100 ml).

The same hydrochloride, melting at about 145°–148°C, is obtained after conventional treatment.

EXAMPLE 12

1-[(1-cyclohexyl)-methyl]-4-[2-(α-methyl-phenethylamino)-ethoxy]-benzene hydrochloride or 1-[cyclohexylidene-methyl]-4-[2-(α-methyl-phenethylamino)-ethoxy]-benzene hydrochloride is prepared, using the procedure described in Example 1.

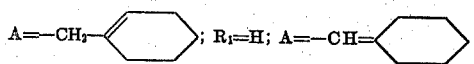

The double bond of the cyclohexenyl may migrate in the side-chain, and an equilibrium is found to become established between both said isomeric forms.

The product melts at 152°–156°C.

EXAMPLE 13

2-Methoxy-1-butyl-4-[2-(α-methyl-phenethylamino)-ethoxy]-benzene hydrochloride, prepared according to the procedures described in above Example 11, melts at 166°–169°C.
A = —C₄H₉; R₁ = —OCH₃

EXAMPLE 14

3'-Methyl-1'-[(1-cyclohexenyl)-methyl]-4-[2-(α-methyl-phenethylamino)-ethoxy]-benzene hydrochloride, which melts at 160°–163°C, is prepared using the procedure of Example 1.

R₁ = CH₃;

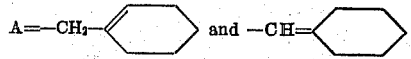

EXAMPLE 15

1-[benzyl]-4-[2-(α-methyl-phenethylamino)-ethoxy]-benzene hydrochloride

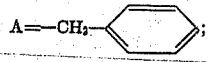

R₁ = H
m.p. = about 172°–176°C, is prepared using the procedure of Example 1.

EXAMPLE 16

1-[cyclohexyl-methyl]-4-[2-(α-methyl-phenethylamino)-ethoxy]-benzene hydrochloride.

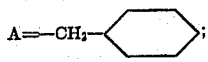

$R_1 = H$ is prepared using the procedure of Example 1. It melts at about 184°–187°C.

EXAMPLE 17

3-Chloro-[(1-cyclohexyl-1-ethoxy)-methyl]-4-[2-(α-methyl-phenethylamino)-ethoxy]-benzene hydrochloride is prepared using the procedure of Example 1.

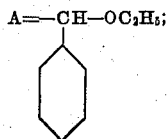

$R_3$ = cyclohexyl; $R_2 = C_2H_5$; $R_1 = Cl$

This product melts at about 165°–170°C.

EXAMPLE 18

1[1-ethoxy-butyl]-4-[2-(α-methyl-phenethylamino)-ethoxy]-benzene is prepared using the procedure of Example 1.

$$A = CH - OC_2H_5;$$
$$\quad\;\; C_3H_7$$

$R_2 = C_2H_5$; $R_3 = C_3H_7$; $R_1 = H$

The hydrochloride of this compound melts at 162°–165°C.

EXAMPLE 19

Substituting butanol for ethanol in Example 4, 1-[1-butoxypropyl]-4-[2-(α-methyl-phenethylamino)-ethoxy]-benzene hydrochloride is obtained under the same conditions.
M.p. = 177°–180°C.

EXAMPLE 20

1-Butenyl-4-[2-(α-methyl-phenethylamino)-ethoxy]-benzene
$A = -CH = CH - CH_2 - CH_3$; $R_1 = H$
This compound is obtained by a procedure similar to procedures 1 or 2 of Example 11.
The hydrochloride melts at 190°–192°C.

EXAMPLE 21

1-[1-ethoxy-butyl]-4-[2-(α-methyl-phenethylamino)-ethoxy]-benzene

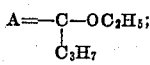

$R_1 = H$

This product is prepared according to the technique described in Example 4. The hydrochloride melts at 164°–165°C.

The results of toxicological and pharmacological tests demonstrating the safe character and the activity of the phenoxyalkylamines of this invention are given below.

I. ACUTE TOXICITY

The acute toxicities of said materials were investigated orally, in Swiss mice and Sprague Dawley rats.

The animals are fasted 18 hours prior to the single administration of the product and are kept under supervision 14 days during which their behavior and death rate were noted.

The $LD_{50}$ of said products, investigated in both species and calculated according to the method according to Litchfield and Wilcoxon are of the order of from 500 to 1,500 mg/kg.

II. CORONARY DILATATOR ACTION

1. On the isolated heart — Langendorff's method

The tests were carried out on the hearts of Fauve de Bourgogne (about 2 kg) rabbits. The hearts are rapidly taken out and maintained in surviving condition by perfusion of a physiological (Tyrode type) liquid heated at 37°C and oxygenated under a constant pressure of 50–60 cm of water. Perfusion of the hearts was effected counter-currently, and volumetric determinations of the coronary rate of flow were recorded at 30 second intervals.

After stabilization of the basic rate of flow, the products, dissolved in physiological saline solution, are injected in a volume of from 0.05 to 0.2 ml.

Dose-action curves were established from the various results obtained.

The products produce a marked increase of the coronary rate of flow which is apparent at a dosage of 10γ; a 50 percent increase of the original rate of flow is obtained, depending on the test products, at a dosage comprised within the range from 15γ to 100γ.

2. On the whole animal

The tests were carried out in male and female dogs having a weight between 10 and 15 kg.

After chloralose-induced anesthesia, the animals are placed under artificial respiration.

The carotid pressure is recorded, together with the cardiac frequency and the electrocardiogram.

The coronary flux is investigated by means of a nycotron.

The test materials were dissolved in physiological saline solution and administrated by the intravenous route.

Increase of the coronary flux is observed at dosages from 0.5 to 2 mg/kg.

III. ACTION ON CONTRACTILE STRENGTH

The tests were carried out either in the whole animal, or in the isolated heart.

Dogs, both male and female, are anesthetized with chloralose.

Systemic blood pressure is recorded at the level of the carotid with an electric sensor.

The contractile strength of the heart was measured with a strain gauge attached to the wall of the right ventricle.

The products, dissolved in physiological saline solution, are administered intraveneously (external saphenous vein).

The phenoxyalkylamines of this invention produce an increase of the contractile strength of the heart which becomes more marked with time. Generally, this action has a duration of over 100 minutes. The cardiotonic action is apparent at dosages from 0.5 to 2 mg/kg.

The products were tested on the isolated heart of rabbit maintained in surviving condition by Langendorff's method. Cardiac stimulation is apparent at dosages of about 200γ.

IV. SPASMOLYTIC ACTION

The spasmolytic action was studied in vitro with a fragment of duodenum of rat maintained in surviving condition in an oxygenated physiological liquid. Inhibition of 50 percent of the contraction due to effusion of a given dose of acetylcholine and barium was studied. The $ED_{50}$ of the test products is comprised within a range from 20 to 65γ with respect to acetylcholine-induced contraction, and within a range from 15 to 80γ with respect to barium-induced contraction.

It is apparent from such tests that the phenoxyalkylamines of this invention and their non-toxic salts are useful in human therapeutics for the curative or preventive treatment of heart conditions, as coronary vasodilatator, cardiotonic and spasmolytic drug.

In such applications, the therapeutic composition is advantageously administered orally, at a dosage of from 150 to 750 mg of active ingredient per 24 hours.

Any formulations suitable for this route of administration may be used, the active ingredient being admixed with a pharmaceutically acceptable carrier ou excipient.

An example of such a formulation is given:

| Tablets containing each | 50 mg (average dose) |
| | 100 mg (strong dose) |
| Excipients | Talc |
| | Lactose |
| | Mg stearate, q.s. to make 1 tablet. |

Having now described my invention what I claim and desire to secure by Letters Patent is:

1. 1-[1-ethoxy-propyl]-4-[2-(α-methyl-phenethylamino]-benzene.
2. 1-Butenyl-4-[2-(α-methyl-phenethylamino)-ethoxy]-benzene.
3. 1-[1-ethoxy-butyl]-4-[2-(α-methyl-phenethylamino)-ethoxy]-benzene.

* * * * *